Nov. 6, 1956 F. M. ALEXANDER ET AL 2,769,472
CITRUS JUICE EXTRACTOR HAVING PEEL SEPARATOR
Filed June 5, 1953 2 Sheets-Sheet 1
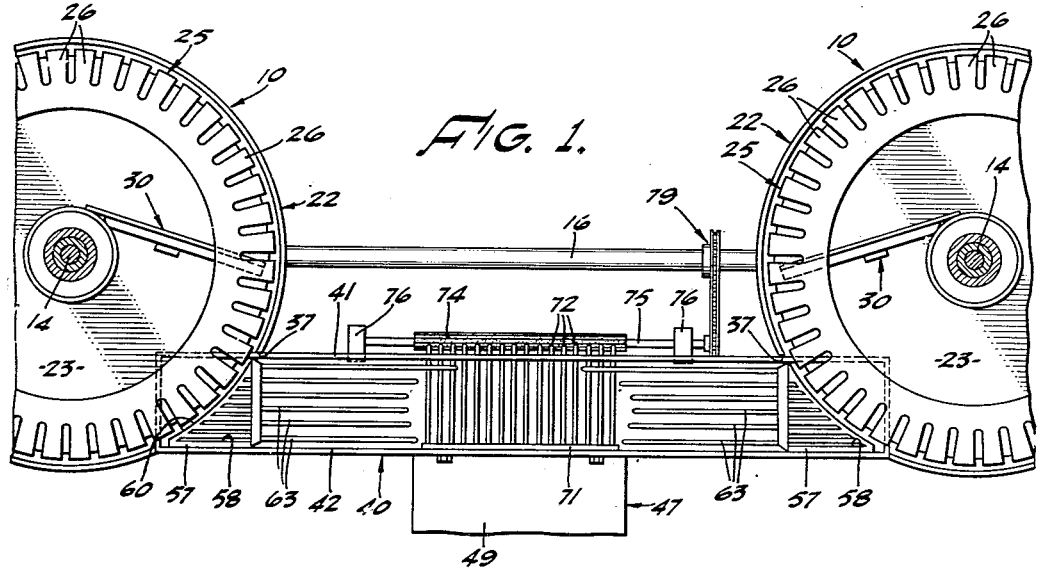
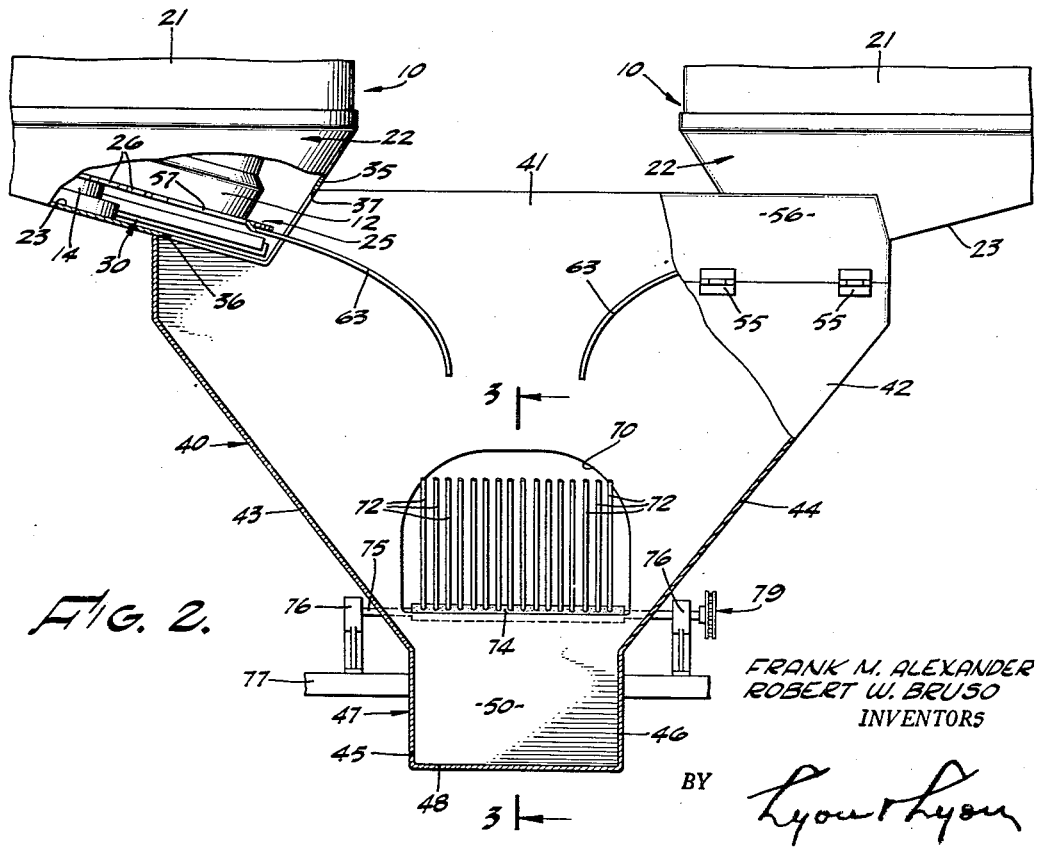
FRANK M. ALEXANDER
ROBERT W. BRUSO
INVENTORS
BY Lyon & Lyon
ATTORNEYS Nov. 6, 1956  F. M. ALEXANDER ET AL  2,769,472
CITRUS JUICE EXTRACTOR HAVING PEEL SEPARATOR
Filed June 5, 1953  2 Sheets-Sheet 2
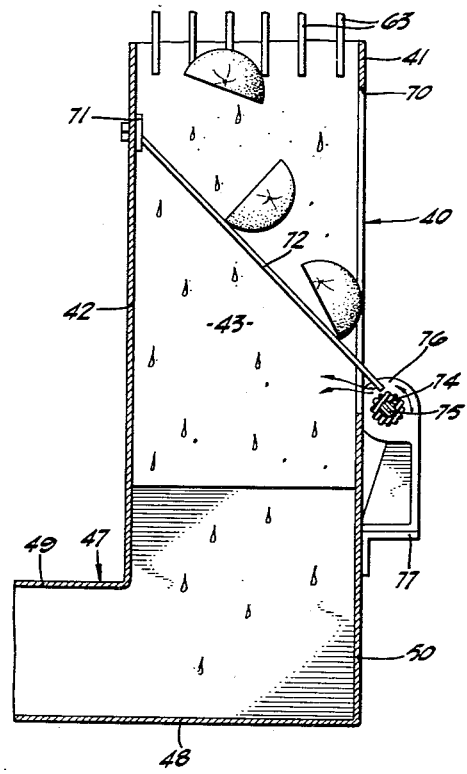
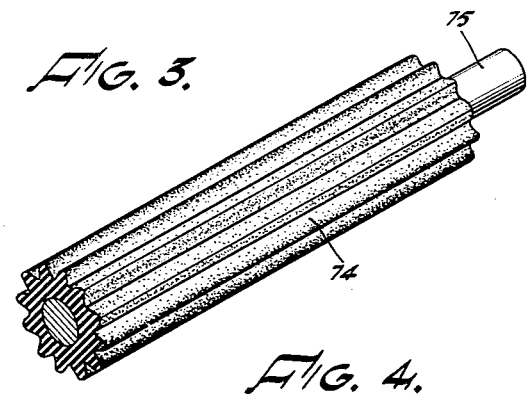
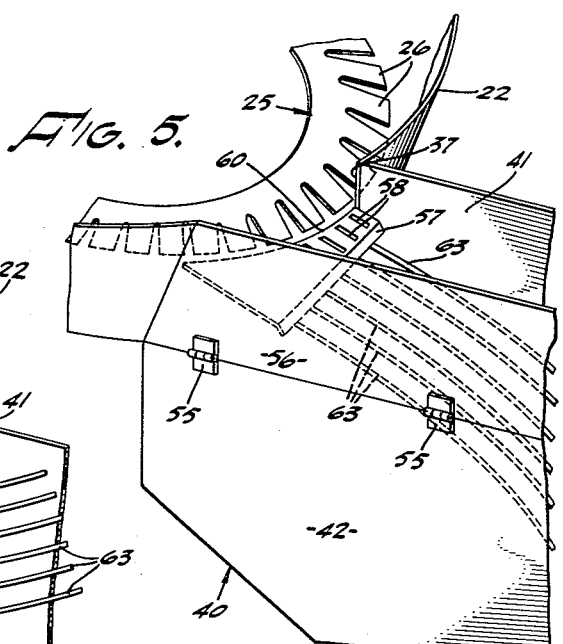
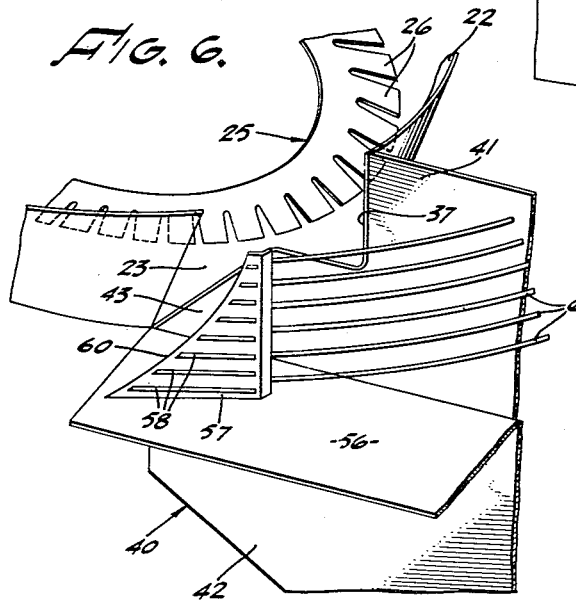
FRANK M. ALEXANDER
ROBERT W. BRUSO
INVENTORS
BY Lyon & Lyon
ATTORNEYS

United States Patent Office 2,769,472
Patented Nov. 6, 1956

2,769,472

CITRUS JUICE EXTRACTOR HAVING PEEL SEPARATOR

Frank M. Alexander and Robert W. Bruso, Winter Haven, Fla., assignors to Brown Citrus Machinery Corporation, Whittier, Calif., a corporation of California Application June 5, 1953, Serial No. 359,785

7 Claims. (Cl. 146—3)

This invention relates to juice extracting machines and has particular reference to improvements in citrus juice extracting machines.

One of the principal objects of this invention is to provide a citrus juice extracting machine having novel and improved means for separation of the citrus peel from the pulp and juice extracted therefrom.

Another object of this invention is to provide a reamer type citrus juice extracting machine having novel means for maximum recovery of pulp extracted from the fruit.

Other objects and advantages of this invention it is believed will be readily apparent from the following detailed description of a preferred embodiment thereof when read in connection with the accompanying drawings.

In the drawings:

Figure 1 is a top plan view of a citrus juice extracting machine constructed in accordance with this invention, portions of the machine being removed for clarity of illustration.

Figure 2 is a rear elevation of a portion of the machine, partly in section.

Figure 3 is a sectional view taken substantially on the line 3—3 of Figure 2.

Figure 4 is a perspective view of the fluted pulp recovery roller.

Figure 5 is a fragmentary perspective view illustrating details of the pulp and juice separating assembly.

Figure 6 is a view similar to Figure 5, but illustrating the gate member in open position.

The machine of this invention is an improvement over that disclosed in U. S. Patent 2,199,876, to William O. Brown, and more specifically over the copending application of Carl Harden, Serial No. 204,035, filed January 2, 1951, now Patent No. 2,705,984.

Referring now to the drawings, the machine includes a pair of juice extracting mechanisms generally indicated 10, which receive and extract the juice from fruit halves delivered thereto by means of apparatus not shown herein but shown and described in the patent and application referred to above. The mechanisms 10 include complementary cups and reamers (not shown) for extracting the juice, the reamers being mounted for rotation on reamer spindle carrying frames 12, each of which is in turn carried on a reamer unit driving shaft 14. The frames 12 are driven by means of suitable gearing (not shown) from a drive shaft 16, which shaft is driven by suitable gearing from a motor (not shown).

The juice extracting mechanisms 10 include casings, each of which comprises a cylindrical cover member 21 and a juice collecting pan 22 having a circular bottom 23. An annular rotating separator grid 25, provided with a plurality of radial fingers 26, is secured to the underside of the spindle carrying frame and extends outwardly therefrom to cooperate with the sides of the pan 22 in separating the juice and a portion of the pulp from exhausted fruit peel. A wiper member 30 is carried on each of the driver shafts 14, the wiper members contacting the respective pan bottoms 23 to continuously sweep the same and thus prevent accumulation of pulp.

The pans 22 are each provided with walls 35 and 36 forming an opening 37 in each of the respective sides and bottoms thereof. A housing 40 extends between the pans 22 and encloses the openings 37, the housing being provided with side walls 41 and 42 and end walls 43 and 44. As shown best in Figure 2, the end walls converge downwardly to merge into and form the side walls 45 and 46 of a juice and pulp removal trough 47. The trough is provided with bottom and top walls 48 and 49, and an end wall 50 which forms a continuation of the housing side wall 41.

Secured to the upper portion of the housing side wall 42 by means of hinges 55 is a gate member 56. A pair of stationary grid members 57 are secured to the gate member at each end thereof. The grid members are preferably formed of sheet metal, are provided with slots 58 and are so located on the gate member as to normally lie in the plane of the rotating grid 25. The rear edges 60 of the grid members 57 are curved to be ends 16 of the carriage to provide a securing device for attaching a cable to the carriage. The carriage may be moved longitudinally along the track T by means of a thereto to prevent peel from falling therebetween. A cable and motor drive. Any well-known and convenon brackets 24b for engaging the underside of the rails to hold the carriage thereon. The carriage C may be of the housing side wall 42, and extending downwardly and outwardly therefrom and through the opening 70 is a plurality of wire fingers 72 forming a peel discharge grid.

A fluted roller 74 carried on a shaft 75 is mounted immediately below the lower ends of the wire fingers 72. As shown, the shaft 75 is journaled in suitable bearings 76 supported on a frame member 77. A suitable transmission 79 connects the shaft 75 in driven relation with the drive shaft 16, so that the roller 74 is rotated in the direction of the arrow in Figure 3. As indicated in Figure 4, the roller is formed of rubber-like material, and it preferably is formed of a synthetic rubber.

In operation, fruit halves are reamed by the mechanisms 10 to extract the juice and pulp therefrom. The juice and a portion of the pulp falls by gravity through the rotating grids 25 to the bottoms of the pans 22, thence downwardly onto the openings 37, down the surfaces of housing end walls 43 and 44, and then into the trough 47 to be thereby carried away from the machine to the subsequent processing station. The reamed peel and the remaining portion of the pulp is carried around on the rotating grids, discharged out through the side openings 37, to fall by gravity down the secondary stationary grids 63, and onto the fingers 72 forming the peel discharge grid. The peel and pulp then falls by gravity downwardly along the fingers 72, the peel discharging out through the housing side wall opening 70, a large portion of the pulp falling between the fingers 72 and into the trough 47. Loss of the remaining portion of the pulp is prevented by means of the fluted roller 74 which, as it is contacted by the falling pulp particles, propels or throws the particles in the direction of the arrows in Figure 3, returning them to the interior of the housing whereupon they fall into the trough to be recovered along with the juice and the balance of the pulp.

As shown in Figure 6, the separator assembly may be easily made accessible for cleaning, merely by opening the gate member 56.

While a specific embodiment of this invention has been shown and described, it is not intended to limit the same to the exact details of the construction set forth, and it

We claim:

1. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a pair of first separator grid members secured to said housing and extending downwardly from said openings, said grid members converging toward the center of said housing, a second separator grid member positioned below said pair of first grid members to receive peel and pulp falling therefrom, said second grid member being secured to another wall of said housing and extending downwardly and outwardly through the opening in the first-mentioned wall of said housing, and means for returning pulp particles from the lower end of said second grid member to the interior of said housing.

2. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a gate member operably connected to another wall of said housing, a pair of first separator grid members secured to said gate member and extending downwardly from said openings, said grid members converging toward the center of said housing, a second separator grid member positioned below said pair of first grid members to receive peel and pulp falling therefrom, said second grid member being secured to said other wall of said housing and extending downwardly and outwardly through the opening in the first-mentioned wall of said housing, and means for returning pulp particles from the lower end of said second grid member to the interior of said housing.

3. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a pair of first separator grid members secured to said housing and extending downwardly from said openings, said grid members converging toward the center of said housing, a second separator grid member positioned below said pair of first grid members to receive peel and pulp falling therefrom, said second grid member being secured to another wall of said housing and extending downwardly and outwardly through the opening in the first-mentioned wall of said housing, and a roller mounted for axial rotation immediately below the lower end of said second grid member, said roller being adapted to return pulp particles from the lower end of said second grid to the interior of said housing.

4. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a gate member operably connected to another wall of said housing, a pair of first separator grid members secured to said gate member and extending downwardly from said openings, said grid members converging toward the center of said housing, a second separator grid member positioned below said pair of first grid members to receive peel and pulp falling therefrom, said second grid member being secured to said other wall of said housing and extending downwardly and outwardly through the opening in the first-mentioned wall of said housing, and a roller mounted for axial rotation immediately below the lower end of said second grid member, said roller being adapted to return pulp particles from the lower end of said second grid to the interior of said housing.

5. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a gate member operably connected for pivotal movement about a horizontal axis to another wall of said housing, a pair of first separator grid members secured to said gate member and extending downwardly from said openings, said grid members converging toward the center of said housing, a second separator grid member positioned below said pair of first grid members to receive peel and pulp falling therefrom, said second grid member being secured to said other wall of said housing and extending downwardly and outwardly through the opening in the first-mentioned wall of said housing, and a roller mounted for axial rotation immediately below the lower end of said second grid member, said roller being adapted to return pulp particles from the lower end of said second grid to the interior of said housing.

6. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a pair of first separator grid members secured to said housing and extending downwardly from said openings, said grid members converging toward the center of said housing, a second separator grid member positioned below said pair of first grid members to receive peel and pulp falling therefrom, said second grid member being secured to another wall of said housing and extending downwardly and outwardly through the opening in the first-mentioned wall of said housing, and a longitudinally fluted roller mounted for axial rotation immediately below the lower end of said second grid member, said roller being adapted to return pulp particles from the lower end of said second grid to the interior of said housing.

7. In a citrus juice extracting machine of the type having a pair of extracting mechanisms for simultaneously extracting citrus juice and pulp from fruit halves, the combination with said mechanisms of a casing enclosing each of said mechanisms, each casing including a juice collecting pan and each pan having an opening in the lower portion thereof, walls forming a housing connecting the juice collecting pans and enclosing said openings, said housing having an opening in one of said walls, a gate member operably connected to another wall of said housing, a pair of first separator grid members secured to said gate member and extending downwardly from said openings, said grid members converging toward the center of said housing, a second separator grid member positioned below said pair of first grid members to receive peel and pulp falling therefrom, said second grid member being secured to said other wall of said housing and extending downwardly and outwardly through the opening in the first-mentioned wall of said housing, and a longitudinally fluted roller mounted for axial rotation immediately below the lower end of said second grid member, said roller being adapted to return pulp particles from the lower end of said second grid to the interior of said housing.

References Cited in the file of this patent

UNITED STATES PATENTS

| | | |
|---|---|---|
| 2,004,056 | Pipkin | June 4, 1935 |
| 2,205,059 | Clark | June 18, 1940 |
| 2,212,066 | Fry | Aug. 20, 1940 |
| 2,602,479 | Trainor | July 8, 1952 |